United States Patent
Watanabe

(10) Patent No.: US 10,380,080 B2
(45) Date of Patent: Aug. 13, 2019

(54) INFORMATION PROCESSING APPARATUS, STORAGE MEDIUM, AND INFORMATION PROCESSING METHOD

(71) Applicant: FUJI XEROX CO., LTD., Tokyo (JP)

(72) Inventor: Masao Watanabe, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 397 days.

(21) Appl. No.: 15/067,841

(22) Filed: Mar. 11, 2016

(65) Prior Publication Data
US 2016/0196288 A1   Jul. 7, 2016

Related U.S. Application Data

(63) Continuation of application No. PCT/JP2014/074990, filed on Sep. 22, 2014.

(30) Foreign Application Priority Data

Jan. 7, 2014  (JP) ................. 2014-000763

(51) Int. Cl.
*G06F 16/21* (2019.01)
*G06F 21/62* (2013.01)
*G06Q 10/10* (2012.01)
*G06F 16/901* (2019.01)

(52) U.S. Cl.
CPC .......... *G06F 16/21* (2019.01); *G06F 16/9024* (2019.01); *G06F 21/62* (2013.01); *G06Q 10/10* (2013.01)

(58) Field of Classification Search
CPC ............... G06F 21/604; G06F 12/0864; G06F 17/30958; G06F 2221/2113; G06F 3/00; G06F 2221/2141
See application file for complete search history.

(56) References Cited

U.S. PATENT DOCUMENTS

2004/0205089 A1* 10/2004 Alon ..................... H04L 29/06
2006/0143194 A1   6/2006 Stewart et al.
(Continued)

FOREIGN PATENT DOCUMENTS

CN   102227115 A   10/2011
CN   103152375 A   6/2013
(Continued)

OTHER PUBLICATIONS

Giunchiglia et al "Ontology Driven Comunity Access Control" Dipartimento di Ingegneria e Scienza dell'Informazione, University of Trento Via Sommarive 14, Povo 38050 Trento, Italy, pp. 1-12. (Year: 2008).*

(Continued)

*Primary Examiner* — Angelica Ruiz
(74) *Attorney, Agent, or Firm* — Oliff PLC

(57) ABSTRACT

An information processing apparatus includes: a comparison unit that compares first access information having a graph structure indicating a predetermined access policy and second access information having a graph structure indicating an access request for access to an object by a user; and a conversion unit that performs an inference on mismatched items using an ontology of the first access information and the second access information and time-limited rules in a case where some of items in the first access information and items in the second access information do not match each other as a result of the comparison made by the comparison unit to convert such items into matching items.

5 Claims, 9 Drawing Sheets

(56) References Cited

U.S. PATENT DOCUMENTS

| | | | | |
|---|---|---|---|---|
| 2007/0107046 | A1* | 5/2007 | Jaeger | G06F 21/57 |
| | | | | 726/4 |
| 2010/0030725 | A1* | 2/2010 | Mendis | G06F 17/30958 |
| | | | | 707/781 |
| 2011/0072506 | A1* | 3/2011 | Law | H04L 63/0227 |
| | | | | 726/11 |
| 2011/0295624 | A1* | 12/2011 | Chapin | G06Q 40/08 |
| | | | | 705/4 |
| 2013/0057746 | A1 | 3/2013 | Takaoka | |
| 2014/0289513 | A1* | 9/2014 | Huang | H04L 63/0428 |
| | | | | 713/160 |
| 2017/0093763 | A1 | 3/2017 | Takaoka | |

FOREIGN PATENT DOCUMENTS

| | | |
|---|---|---|
| JP | 2001-075988 A | 3/2001 |
| JP | 2004-102790 A | 4/2004 |
| JP | 2006-209433 A | 8/2006 |
| JP | 2007-241713 A | 9/2007 |
| JP | 2011-048843 A | 3/2011 |
| JP | 2012-108629 A | 6/2012 |
| JP | 2013-033320 A | 2/2013 |
| WO | 2005/101217 A1 | 10/2005 |

OTHER PUBLICATIONS

May 30, 2017 Office Action issued in Japanese Patent Application No. 2014-000763.

Dec. 16, 2014 Search Report issued in International Patent Application No. PCT/JP2014/074990.

Yamasaki, Shigeichiro; "One stop Service"; The Journal of the Institute of Electronics; Information and Communication Engineers, Feb. 25, 2000; vol. 83, No. 2, pp. 127-131.

Dec. 20, 2018 Office Action issued in Chinese Patent Application No. 201480057103.X.

* cited by examiner

INFORMATION PROCESSING APPARATUS, STORAGE MEDIUM, AND INFORMATION PROCESSING METHOD

CROSS REFERENCE TO RELATED APPLICATION

This is a continuation of International Application No. PCT/JP2014/074990 filed on Sep. 22, 2014, and claims priority from Japanese Patent Application No. 2014-000763, filed on Jan. 7, 2014.

TECHNICAL FIELD

The present invention relates to an information processing apparatus, a storage medium, and an information processing method.

SUMMARY OF INVENTION

The invention provides an information processing apparatus including: a comparison unit that compares first access information having a graph structure indicating a predetermined access policy and second access information having a graph structure indicating an access request for access to an object by a user; and a conversion unit that performs an inference on mismatched items using an ontology of the first access information and the second access information and time-limited rules in a case where some of items in the first access information and items in the second access information do not match each other as a result of the comparison made by the comparison unit to convert such items into matching items.

Figure 1:
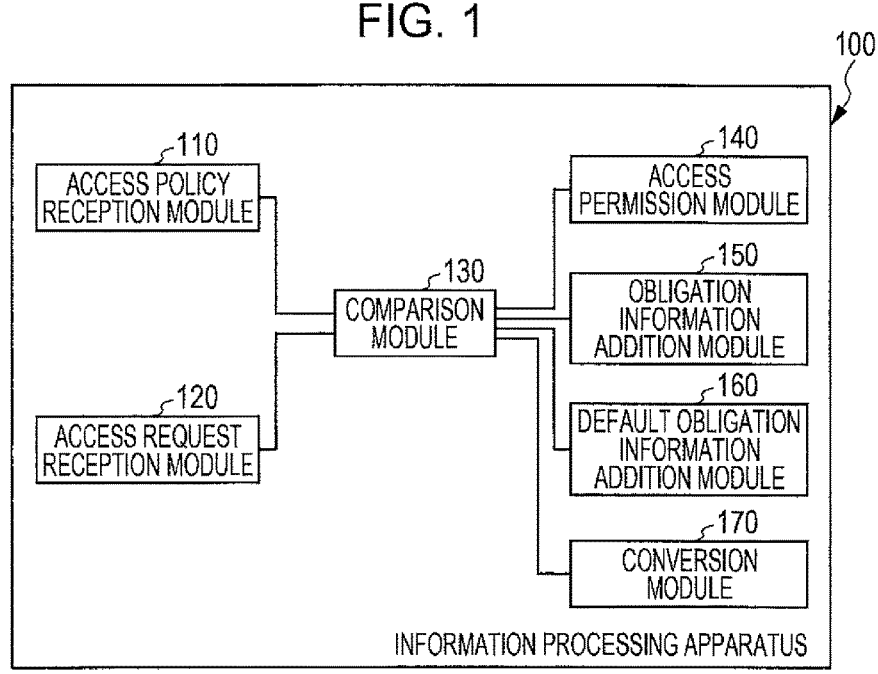
FIG. 1 is a conceptual module configuration diagram illustrating a configuration example of an exemplary embodiment.

REFERENCE SIGNS LIST 100 information processing apparatus
110 access policy reception module
120 access request reception module
130 comparison module
140 access permission module
150 obligation information addition module
160 default obligation information addition module
170 conversion module

DETAILED DESCRIPTION

Before describing an exemplary embodiment, the underlying technology will be described. The description is made for the purpose of facilitating understanding of the exemplary embodiment.

As an organization becomes larger, the flow of information is obstructed because the organization becomes structurally complicated and departments of the organization prepare and hold information required for their operations. In many situations, the departments hold separate customized databases in order to save information required for the departments. In the case where a department requires information from another department, the department normally must be permitted to access the database of the other department. In addition, retrieved data may be old.

In addition, large corporations are subjected to domestic and international laws that require compliance over the entire corporation. In order to meet such requirements, information must be collected over all departments in the corporation in a timely manner.

In the case where a report is to be prepared over the entire organization, however, it is necessary to obtain permissions on the basis of access policies possessed by the separate departments.

A preferable exemplary embodiment for implementing the present invention will be described below with reference to the drawings.

FIG. 1 is a conceptual module configuration diagram illustrating a configuration example of an exemplary embodiment.

The term "module" generally refers to parts such as software (computer program) and hardware that are logically separable from each other. Thus, the modules in the exemplary embodiment include not only modules based on computer programs but also modules based on hardware components. Therefore, the exemplary embodiment also describes a computer program for causing a computer to function as such modules (a program for causing a computer to execute such procedures, a program for causing a computer to function as such units, and a program for causing a computer to implement such functions), a system, and a method. It should be noted, however, that language "store" and "cause . . . to store" and equivalent language is used for convenience of description. In the case where the exemplary embodiment describes a computer program, however, such language means to "cause a storage device to store" or "perform control so as to cause a storage device to store". In addition, the modules may make one-to-one correspondence with the functions. In implementation, however, one module may be constituted of one program, plural modules may be constituted of one program, or conversely one module may be constituted of plural programs. In addition, plural modules may be executed by one computer, or one module may be executed by plural distributed or parallel computers. One module may include another module. In the following description, in addition, the term "connection" is used to indicate not only physical connections but also logical connections (for data exchange, instruction, data reference, etc.). The term "predetermined" means that the modificand has been determined before the target process, and may be used to mean that the modificand is determined in accordance with the situation or the state at the time, or the situation or the state in the past, before the target process even after the process according to the exemplary embodiment is started, not to mention before the process according to the exemplary embodiment is started. In the case where there are plural "predetermined values", such values may be different from each other, or two or more (or all, as a matter of course) of such values may be the same as each other. In addition, the wording "in the case where A, then B" is used to mean "it is determined whether or not A, and in the case where it is determined that A, then B". It should be noted, however, that cases where it is not necessary to determine whether or not A are excluded.

In addition, the system or the device may be constituted of plural computers, hardware, devices, etc. connected by communication means such as a network (including a one-to-one communication connection), or may be implemented by one computer, hardware, device, etc. The terms "device" and "system" are used as synonyms for each other. As a matter of course, the term "system" does not include mere social "schemes" (social systems) which are artificial arrangements.

In addition, after each process performed by each module, or after each of plural processes performed in a module, target information is read from a storage device, and the result of the process is written into the storage device after the process is performed. Thus, reading from the storage device before the process and writing into the storage device after the process may not be described. Examples of the storage device may include a hard disk, a RAM (Random Access Memory), an external storage medium, a storage device via a communication line, and a register in a CPU (Central Processing Unit).

An information processing apparatus 100 according to the exemplary embodiment implements an access control technology, and specifically performs a process for comparing an access request and an access policy with each other. As illustrated in the example of FIG. 1, the information processing apparatus 100 includes an access policy reception module 110, an access request reception module 120, a comparison module 130, an access permission module 140, an obligation information addition module 150, a default obligation information addition module 160, and a conversion module 170. For example, the information processing apparatus 100 is used for access control for the entire in-house information including ERP (Enterprise Resource Planning) and SCM (Supply Chain Management). More specifically, the information processing apparatus 100 is used to generate and reuse in-house information for design, development, production, planning, sales, etc. The information processing apparatus 100 relates to a so-called PLM (Product Lifecycle Management) System.

In the exemplary embodiment, examples of the target information (data or a content to be accessed) include:

(1) Numbered drawings, parts, and technical standard documents (covered by the PLM according to the related art)

(2) Official documents such as laws, regulations, and standards (3) Unnumbered documents such as technical specifications, designs, parts, data, and design reviews prepared in the planning phase and the design phase (not covered by the PLM according to the related art)

(4) M2M sensor data generated in the corporation (such as an assembly image, SCM-related information acquired through an RFID, a barcode, etc. and product POS information)

The access policy reception module 110 is connected to the comparison module 130. The access policy reception module 110 receives first access information having a graph structure that indicates a predetermined access policy. For example, the access policy reception module 110 receives the first access information from an external device via a communication line, reads the first access information from a storage device in the information processing apparatus 100, and receives the first access information through an operation performed by an operator using a keyboard or the like. The first access information may be determined for each department, and include a condition for accessing information managed by the department, for example. For example, the condition provides a person who belongs to the department with access for a period of one year from preparation.

The access request reception module 120 is connected to the comparison module 130. The access request reception module 120 receives second access information having a graph structure that indicates an access request for access to a target by a user. For example, the access request reception module 120 receives the second access information from an external device via a communication line, reads the second access information from a storage device in the information processing apparatus 100, and receives the second access information through an operation performed by the user using a keyboard or the like. Examples of the second access information include a search formula prepared by the user. The second access information also includes attribute information (such as identification information on the user, the department to which the user belongs, and the date and time of access) for comparison with the first access information.

The first access information is also called "access control policy information", and possessed by the information processing apparatus 100, for example. The second access information is generated when the user accesses a content, and also called "access control request information". The comparison module 130 compares the access control policy information and the access control request information with each other to decide whether or not the target may be used.

The comparison module 130 is connected to the access policy reception module 110, the access request reception module 120, the access permission module 140, the obligation information addition module 150, the default obligation information addition module 160, and the conversion module 170. The comparison module 130 compares the first access information received by the access policy reception module 110 and the second access information received by the access request reception module 120 with each other. For example, the comparison module 130 corresponds to the processes in and after step S306 (excluding steps S310, S326, S332, and S324) illustrated in FIG. 3 to be discussed later.

The comparison process performed by the comparison module 130 is performed through pattern matching between the first access information and the second access information which have been marked up by tags (indices) indicating the structure, for example.

The access permission module 140 is connected to the comparison module 130. The access permission module 140 permits an access request in the case where the items in the first access information and the items in the second access information match each other as a result of the comparison made by the comparison module 130. For example, the access permission module 140 corresponds to the process in step S310 illustrated in FIG. 3 to be discussed later. The pieces of information are in the equivalent relationship "in the case where the items in the first access information and the items in the second access information match each other".

The obligation information addition module 150 is connected to the comparison module 130. The obligation information addition module 150 adds a predetermined condition to the access request in the case where the items in the first access information and the items in the second access information do not match each other at all as a result of the comparison made by the comparison module 130. For example, the obligation information addition module 150 corresponds to the process in step S332 illustrated in FIG. 3 to be discussed later. The pieces of information are in the perfectly mismatching relationship "in the case where the items in the first access information and the items in the second access information do not match each other at all".

The default obligation information addition module 160 is connected to the comparison module 130. The default obligation information addition module 160 performs an inference on mismatched items using the ontology of the first access information and the second access information and time-limited rules in the case where some of the items in the first access information and the items in the second access information do not match each other as a result of the comparison made by the comparison module 130, and adds a predetermined condition to the access request when there are no matching items. For example, the default obligation information addition module 160 corresponds to the process in step S326 illustrated in FIG. 3 to be discussed later.

The conversion module 170 is connected to the comparison module 130. The conversion module 170 performs an inference on mismatched items using the ontology of the first access information and the second access information and time-limited rules in the case where some of the items in the first access information and the items in the second access information do not match each other as a result of the comparison made by the comparison module 130 to convert such items into matching items. Here, an ontology (conceptual system) is a formal expression of knowledge as a set of concepts in a certain domain and the relationship between such concepts. For example, the conversion module 170 corresponds to the process in step S324 illustrated in FIG. 3 to be discussed later. The pieces of information are in the "partially overlapping" or "including" relationship "in the case where some of the items in the first access information and the items in the second access information do not match each other".

In the case where the conversion module 170 performs an inference to find no matching items, meanwhile, the obligation information addition module 150 or the default obligation information addition module 160 performs a condition addition process.

The comparison process performed by the comparison module 130 uses an ontology in which a policy, access control, and an organization configuration are written semantically, and time-limited rules in which a policy, access control, and an organization structure are written semantically. It is determined which of the "equivalent", "perfectly mismatching", "partially overlapping", and "including" relationships the policies are in.

In the case where the policies are in the perfectly mismatching relationship, a required policy is automatically generated.

In the case where the policies are in the "partially overlapping" or "including" relationship, a policy is generated by combining policy attributes with high orders of priority in accordance with the order of priority prescribed for each policy attribute.

The policy structure is represented as access control information for access control that a user (subject of control) has over a content (object to be controlled). The access control information is constituted by combining control subject information and subject attribute information, control object information and object attribute information, control right information and right granting subject information, information on the obligation of the subject during control, and environmental condition information. The access control information will be discussed later using the examples of FIGS. 4 to 7.

Figure 2:
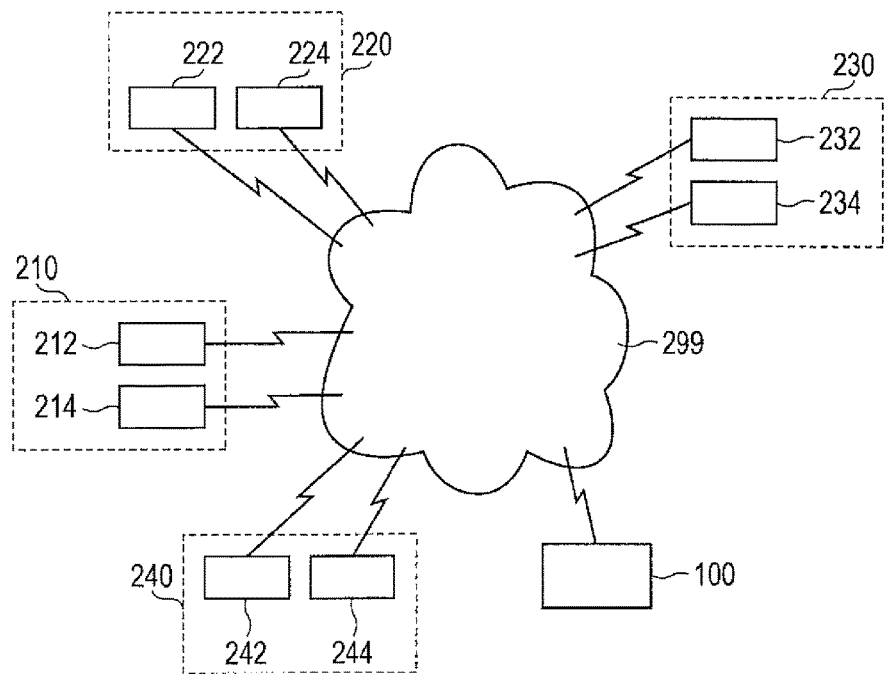
FIG. 2 illustrates a system configuration example for implementing the exemplary embodiment.

FIG. 2 illustrates a system configuration example for implementing the exemplary embodiment.

An Aaa section (organization) 210 has an Aaa DB 212 and an Aaa terminal 214. A Bbb section (organization) 220 has a Bbb DB 222 and a Bbb terminal 224. A Ccc section (organization) 230 has a Ccc DB 232 and a Ccc terminal 234. A Ddd section (organization) 240 has a Ddd DB 242 and a Ddd terminal 244. The information processing apparatus 100, the Aaa DB 212, the Aaa terminal 214, the Bbb DB 222, the Bbb terminal 224, the Ccc DB 232, the Ccc terminal 234, the Ddd DB 242, and the Ddd terminal 244 are connected to each other via a communication line 299.

For example, in the case where the user of the Aaa terminal 214 performs a search operation to attempt access to information in the Bbb DB 222 in the Bbb section (organization) 220, it is determined whether or not the search information (second access information) matches the access policy (first access information) predetermined by the Bbb section (organization) 220. In the case where the two pieces of information are in the perfectly matching relationship, access is permitted. In the case where the two pieces of information are in the perfectly mismatching relationship, a condition predetermined in accordance with the access policy is imposed. In the case where the two pieces of information are in the partially overlapping or including relationship, an inference is performed using the ontology of the first access information and the second access information and time-limited rules to convert mismatched items into matching items.

Figure 3:
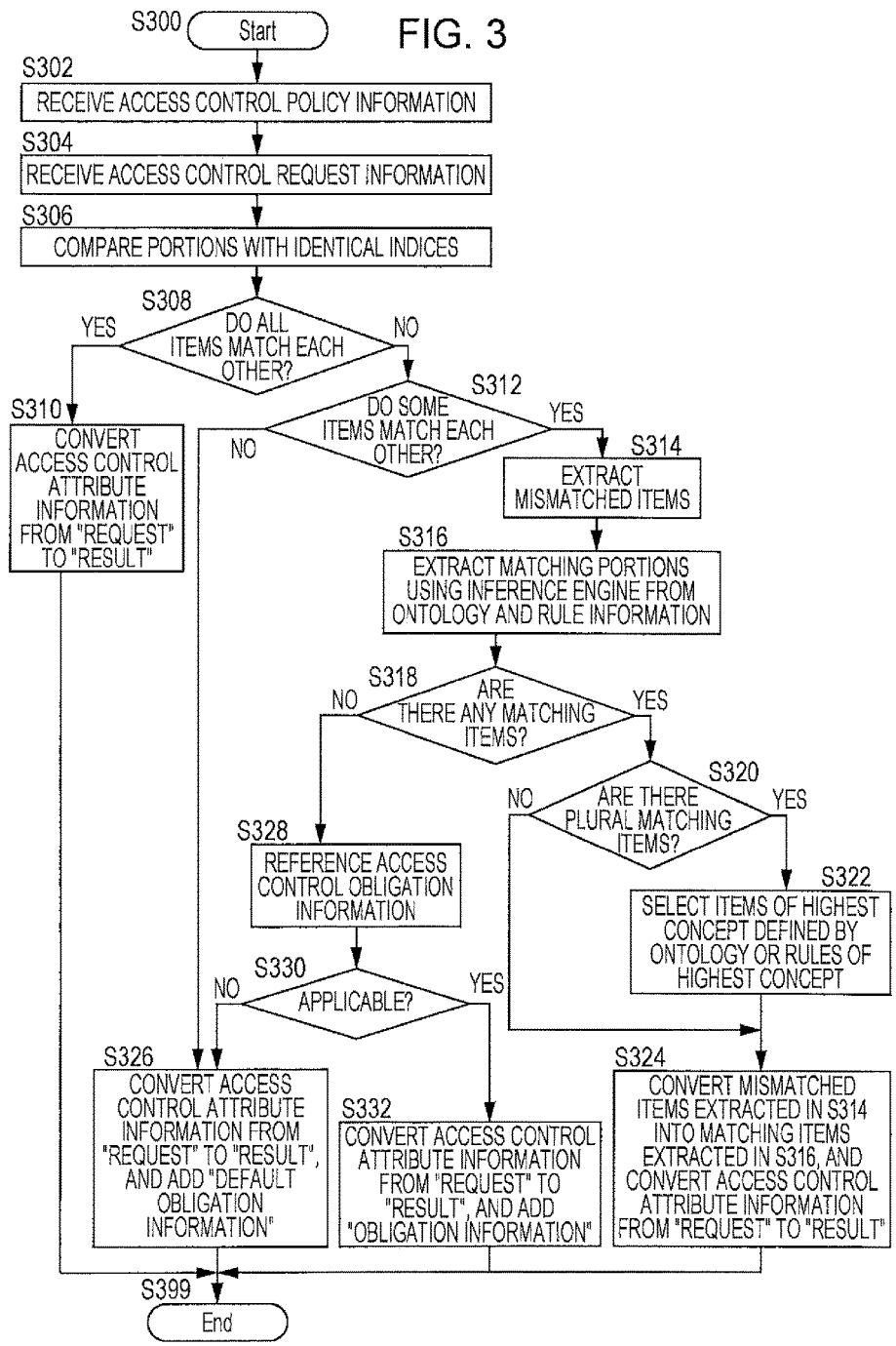
FIG. 3 is a flowchart illustrating a process example according to the exemplary embodiment.

FIG. 3 is a flowchart illustrating a process example according to the exemplary embodiment.

In step 3302, the access policy reception module 110 receives access control policy information.

In step 3304, the access control request reception module 120 receives access control request information.

In step S306, the comparison module 130 compares portions with identical indices. That is, as illustrated in the examples of FIGS. 4 to 7, the access control policy information and the access control request information have a graph structure, and the items of the graph structure are indicated by tags which are indices. For example, the access control policy information may be data illustrated in the example of FIG. 6, and the access control request information may be data illustrated in the example of FIG. 5.

In step S308, the comparison module 130 determines whether or not all the items match each other. In the case where all the items match each other, the process proceeds to step S310. Otherwise, the process proceeds to step S312.

In step S310, the access permission module 140 converts access control attribute information (access control request attribute information 528) from "request" to "result". For example, the data after the conversion may be data illustrated in the example of FIG. 7.

In step S312, the comparison module 130 determines whether or not some of the items match each other. In the case where some of the items match each other, the process proceeds to step S314. Otherwise (in the case where the items perfectly mismatch each other), the process proceeds to step S326.

In step S314, the comparison module 130 extracts mismatched items. Mismatched indices are extracted.

In step S316, the comparison module 130 extracts matching items using an inference engine from the ontology and rule information.

In step S318, the comparison module 130 determines whether or not there are matching items. In the case where there are matching items, the process proceeds to step S320. Otherwise, the process proceeds to step S328.

In step S320, the comparison module 130 determines whether or not there are plural matching items. In the case where there are plural matching items, the process proceeds to step S322. Otherwise, the process proceeds to step S324.

In step S322, the comparison module 130 selects an item of the highest concept defined by an ontology or rules of the highest concept.

In step S324, the conversion module 170 converts the mismatched items extracted in step S314 into the matching items extracted in step S316, and further converts the access control attribute information (access control request attribute information 528) from "request" into "result".

In step S326, the default obligation information addition module 160 converts the access control attribute information (access control request attribute information 528) from "request" to "result", and adds "default obligation information". Here, the default obligation information is a predetermined condition generated from the access control policy information as a comparison target. For example, the default obligation information may be the access control policy information itself.

In step S328, the comparison module 130 references access control obligation information.

In step S330, the comparison module 130 determines whether applicable or not. If applicable, the process proceeds to step S332. Otherwise, the process proceeds to step S326.

In step S332, the obligation information addition module 150 converts the access control attribute information (access control request attribute information 528) from "request" to "result", and adds "obligation information".

Figure 4:
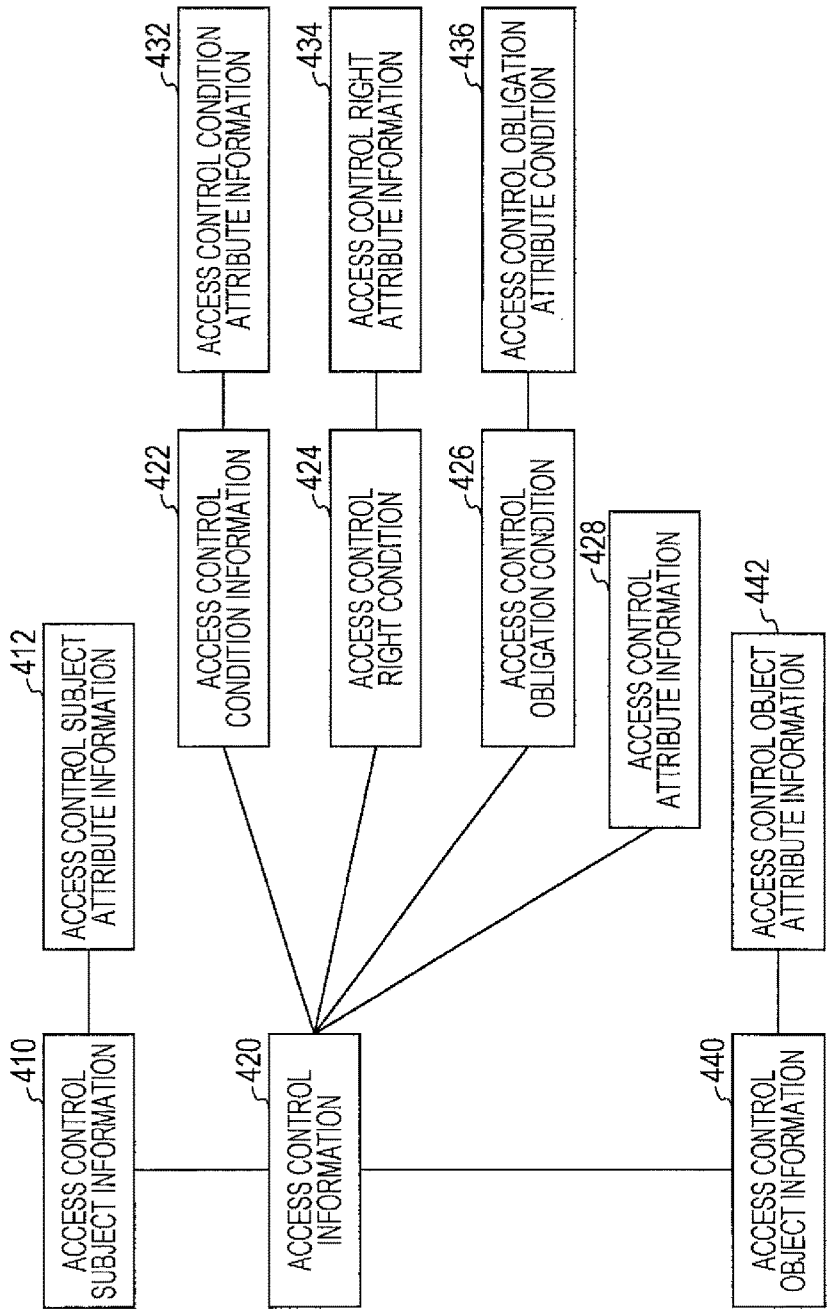
FIG. 4 illustrates an example of the data structure of access control data (for general purposes).

FIG. 4 illustrates an example of the data structure of access control data (for general purposes).

As an example, access control information 420 which serves as policy data here is composed of access control subject information 410, access control condition information 422, an access control right condition 424, an access control obligation condition 426, access control attribute information 428, and access control object information 440. Further, the access control subject information 410 includes access control subject attribute information 412, the access control condition information 422 includes access control condition attribute information 432, the access control right condition 424 includes access control right attribute information 434, the access control obligation condition 426 includes an access control obligation attribute condition 436, and the access control object information 440 includes access control object attribute information 442.

Figure 5:
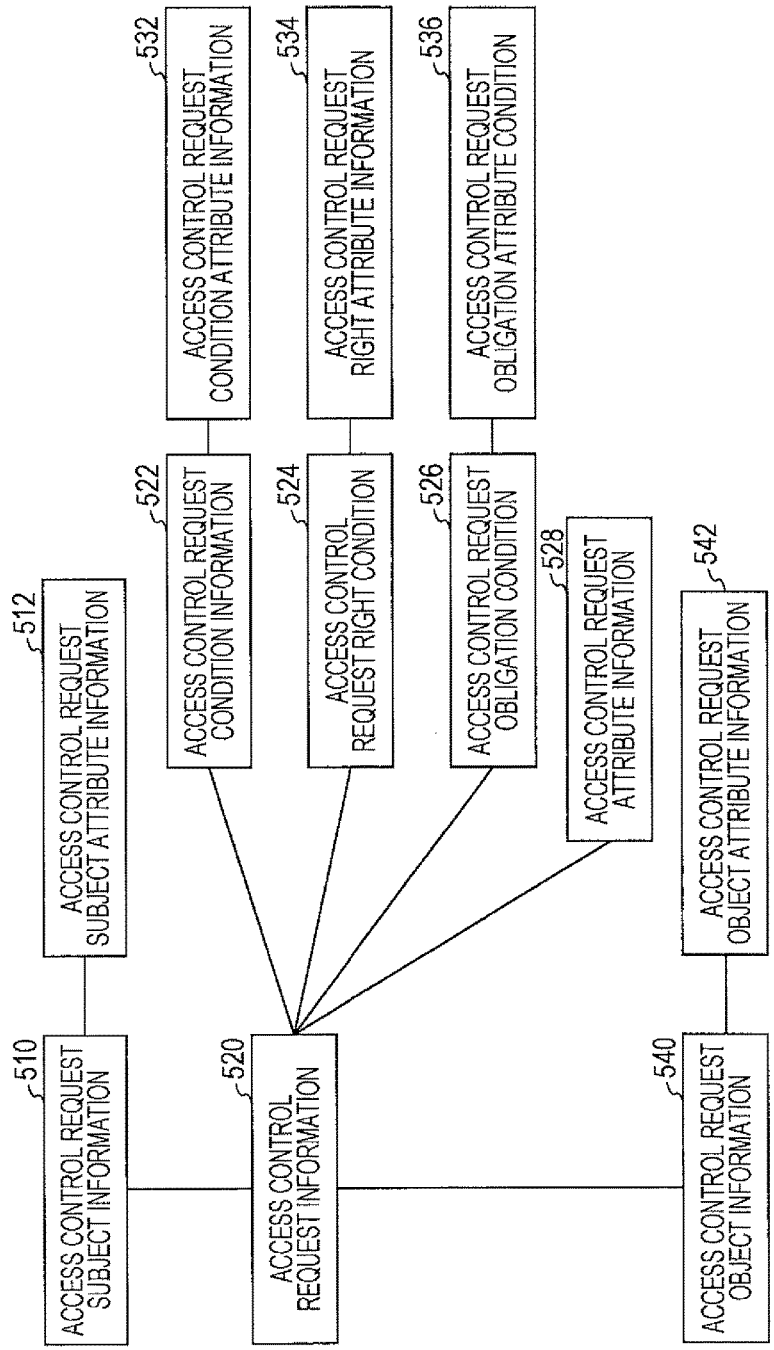
FIG. 5 illustrates an example of the data structure of access control data (exclusively for request).
Figure 6:
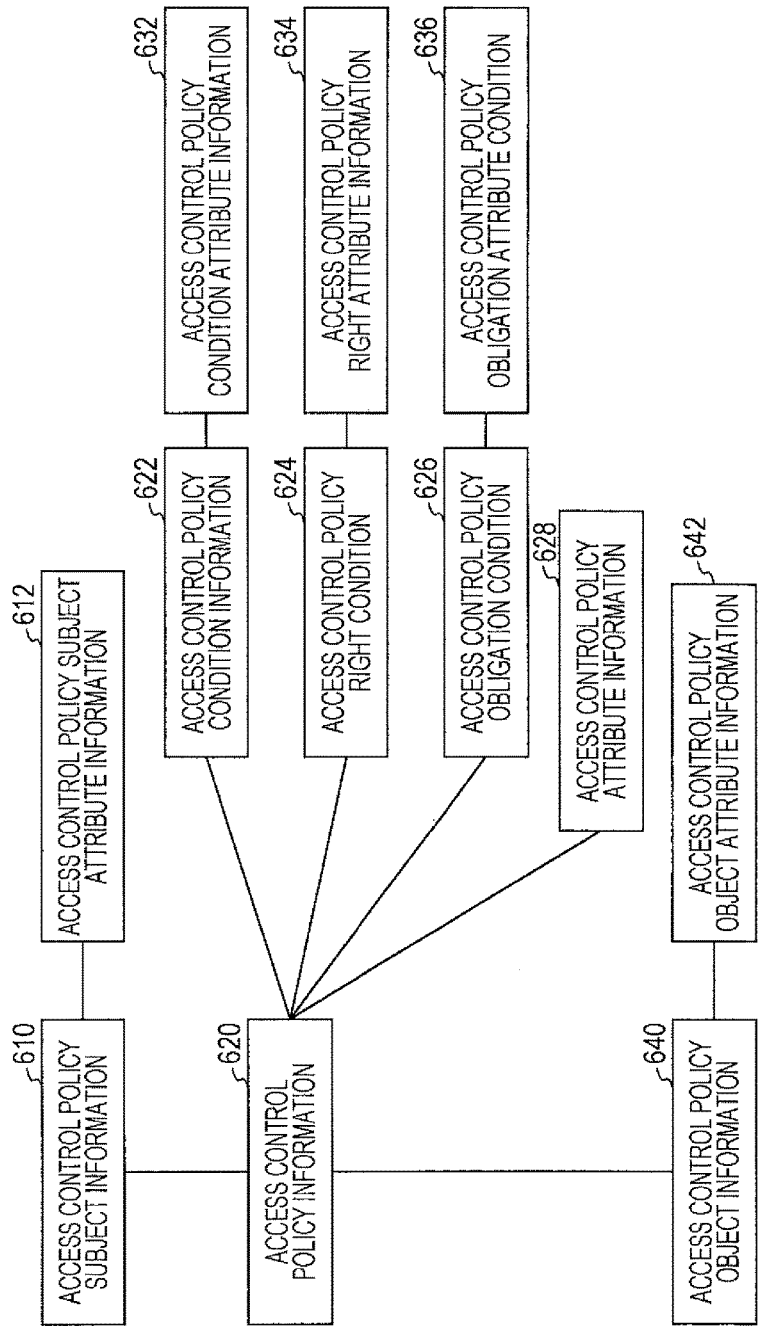
FIG. 6 illustrates an example of the data structure of access control data (exclusively for policy).
Figure 7:
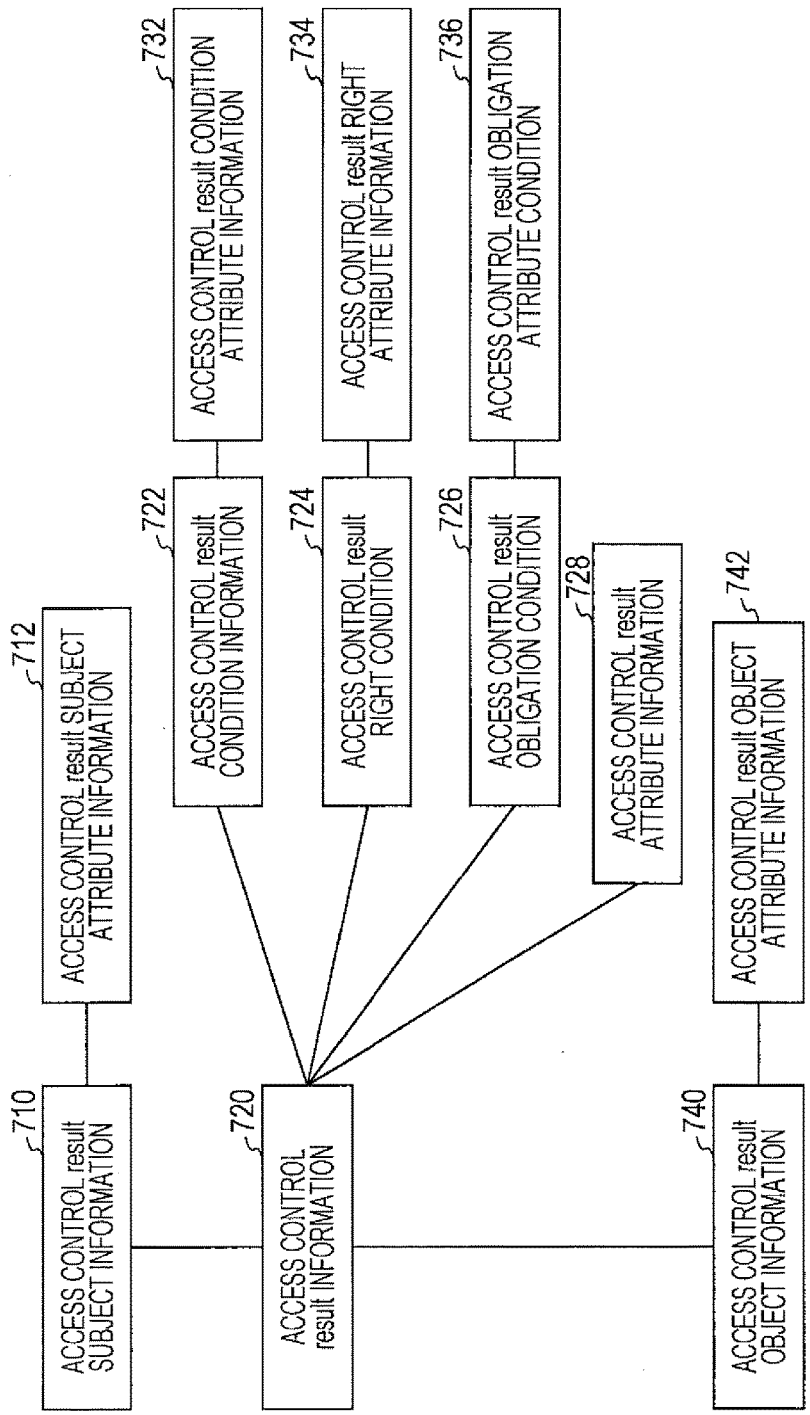
FIG. 7 illustrates an example of the data structure of access control data (exclusively for result).

By writing one of "request", "policy", and "result" in the access control attribute information 428, the data structure of access control data (exclusively for request) illustrated in the example of FIG. 5, the data structure of access control data (exclusively for policy) illustrated in the example of FIG. 6, and the data structure of access control data (exclusively for result) illustrated in the example of FIG. 7, respectively, are obtained. The access control data illustrated in the example of FIG. 5 are generated by a search commanded by the user etc. The policy data illustrated in the example of FIG. 6 have been set or stored in advance. Further, the data may be generated using access control rules defined in different organizational hierarchies and an ontology that defines the organization. The access control data illustrated in the example of FIG. 7 are generated as a result of comparison between the access control data illustrated in the example of FIG. 5 and the access control data illustrated in the example of FIG. 6.

Such access control data are written in RDF (Resource Description Framework), XML (eXtensible Markup Language), or the like.

The access control subject information 410 is written with the user name, the user ID (IDentification), the user URI (Uniform Resource Identifier), and so forth.

The access control subject attribute information 412 is written with the role of the user, belonging, the location of access, the date and time of access, the terminal of access, and so forth.

The access control object information 440 is described with the ID number provided in advance, the content name, the content URI, and so forth.

The access control object attribute information 442 is written with the role of the content, the meaning of the content, mark-up information in the content, information at the time of generation of the content, change information on the content, relation information on the content, information on the right holder for the content, confidentiality level information on the content, and so forth.

The access control condition information 422 describes an environmental condition required during access control. Specifically, the access control condition information 422 describes attribute information on the environment such as context information etc.

The access control right condition 424 is written with an action of the user on the content. Specific examples include reading the content, writing into the content, signing the content, encrypting the content, and viewing only a part of the content.

The access control obligation condition 426 is written with an obligation to be imposed on the user during access control. The obligation to be imposed on the user should be performed by the user during access control, and may be acquisition of permission from a control authority granting subject.

Besides, control right granting subject information may also be included. The control right granting subject information is written with the subject which granted a control right for the content. Specific examples include the user name, the user ID, the user URI, the date of the grant of the control authority, the location of the grant of the control authority, and the period of the authority.

Such access control data are constituted using an ontology and rules. The ontology is obtained by semantically writing a policy, access control, and an organization configuration. Specifically, the ontology is expressed in the RDF format. Meanwhile, the rules are obtained by semantically writing a policy, access control, and an organization structure. Specifically, the rules are expressed in the RDF format.

Figure 8:
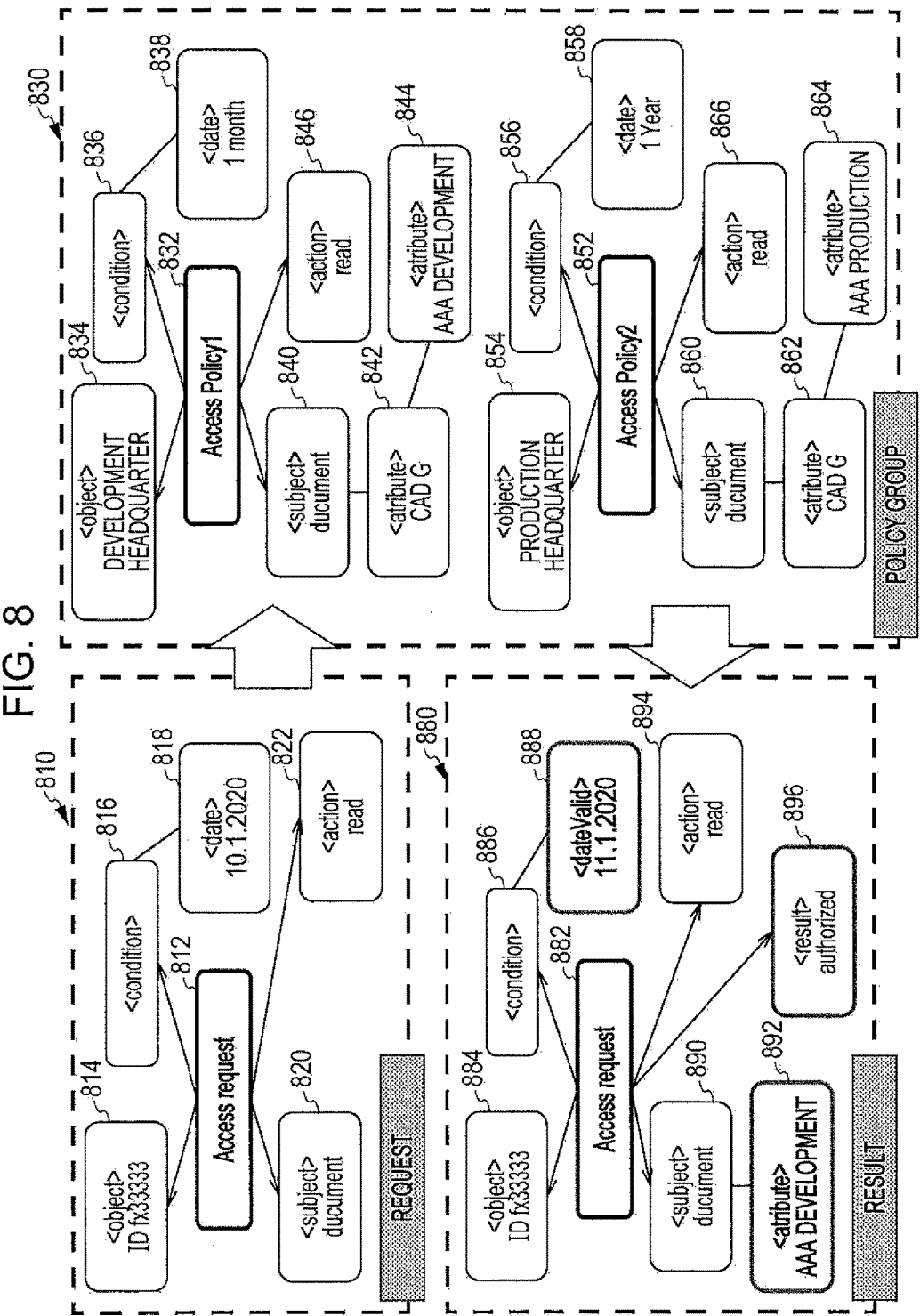
FIG. 8 illustrates a process example according to the exemplary embodiment.

FIG. 8 illustrates a process example according to the exemplary embodiment.

As illustrated in the example of FIG. 8, an Access request 812 in a request 810 is composed of an object 814, a condition 816, a date 818, a subject 820, and an action 822. The Access request 812 has been transmitted by the user as an access control request as a search request, and is received from the Aaa terminal 214 or the like by the access request reception module 120.

A policy group 830 includes access policies including an Access Policy 1 832 and an Access Policy 2 852. As illustrated in the example of FIG. 8, the Access policy 1 832 is composed of an object 834, a condition 836, a date 838, a subject 840, an attribute 842, an attribute 844, and an action 846. As illustrated in the example of FIG. 8, the Access policy 2 852 is composed of an object 854, a condition 856, a date 858, a subject 860, an attribute 862, an attribute 864, and an action 866. The Access policy 1 832 and the Access policy 2 852 are access policies for accessing data in data repositories of the Aaa DB 212, the Bbb DB 222, the Ccc DB 232, and the Ddd DB 242.

The Access policy 1 832 and the Access policy 2 852 are received from the Aaa DB 212 or the like by the access policy reception module 110. Application rules for the access policies (Enterprise Access Policy Rules (such as the priority of the policy and the period of application)) may be received.

Here, when the Access request 812 in the request 810 is received, the Access request 812 and the Access Policy 1 832 are compared with each other. In this event, attribute information on the user who transmitted the Access request 812 is collected. Then, individual access policies are generated and determined using an inference engine constructed by a Prolog or the like using user attribute information, the access policies (the Access Policy 1 832 and the Access Policy 2 852), and the application rules for the access policies. As a result, an Access request 882 in a result 880 is generated. As illustrated in the example of FIG. 8, the Access request 882 is composed of an object 884, a condition 886, a dateValid 888, a subject 890, an attribute 892, an action 894, and a result 896.

The date 818 of the Access request 812 and the date 838 of the Access Policy 1 832 are compared with each other to generate the dateValid 888. Then, the subject 820 of the Access request 812 does not have counterparts of the attribute 842 and the attribute 844 of the Access Policy 1 832, and thus the attribute 892 has been generated. Then, as a result, the result 896 is generated. That is, an inference function is used to estimate an element for which access control has not been expressly defined (the Access request 812 does not have counterparts for the attribute 842 and the attribute 844), and define the attribute 892.

Then, user access control is performed on the basis of the result of the determination. In the case where access is denied, a condition required for access is presented.

Figure 9:
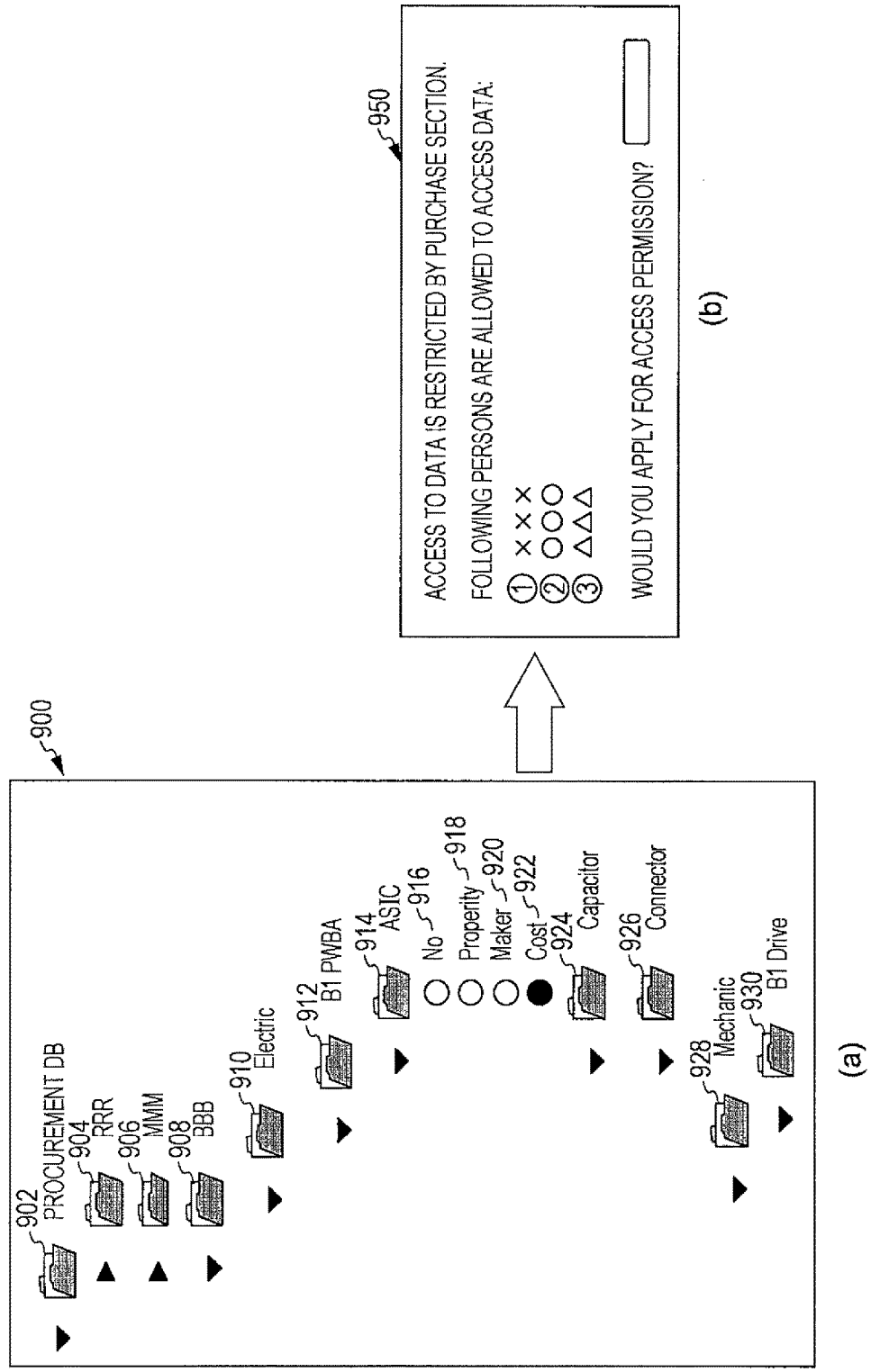
FIG. 9 illustrates a process example according to the exemplary embodiment.

FIG. 9 illustrates a process example according to the exemplary embodiment.

The file structure of data stored in the Aaa DB 212 etc. is illustrated in a folder configuration display region 900. In the case where the user attempts to access data in a folder (accessible) 914 in a folder (accessible) 912 in a folder (accessible) 910 in a folder (accessible) 908 in a folder (accessible) 902 (e.g. in the case where the user clicks on data (inaccessible) 922), an access restriction display region 950 is displayed. Only items are displayed for data determined to be inaccessible by the comparison module 130. In addition, the form of an icon such as color and shape may be changed to indicate that the data are inaccessible.

In the case where the data are inaccessible, processes by the obligation information addition module 150, the default obligation information addition module 160, and the conversion module 170 are performed.

As a result of such processes, a message "Access to data is restricted by purchase section. Following persons are allowed to access data: (1) xxx, (2) ○○○, and (3) △△△. Would you apply for access permission?" is displayed in the access restriction display region 950. The message indicates the condition for access to the data obtained as a result of the inference discussed above.

In the case where there is no access policy corresponding to the access request, an indication that no access policy has yet been set may be displayed.

Figure 10:
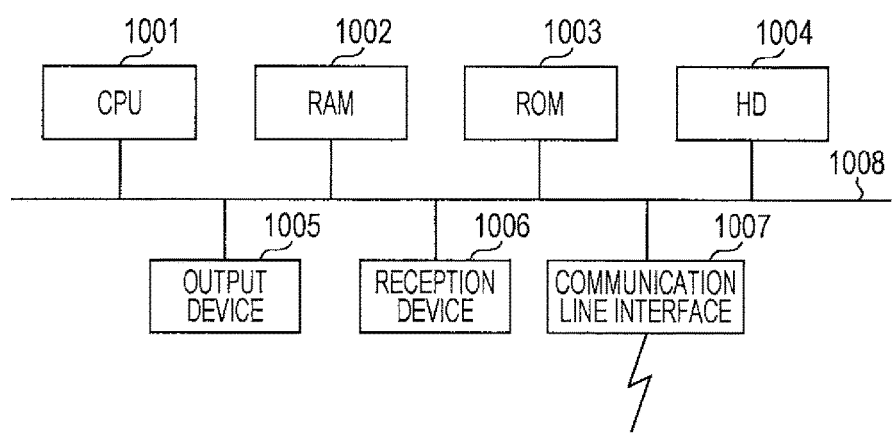
FIG. 10 is a block diagram illustrating an example of the hardware configuration of a computer that implements the exemplary embodiment.

As illustrated in FIG. 10, the hardware configuration of a computer that executes a program as the exemplary embodiment is a common computer, specifically a computer that may serve as a personal computer, a server, or the like. That is, as a specific example, the computer includes a CPU 1001 as a processing section (computation section) and a RAM 1002, a ROM 1003, and an HD 1004 as storage devices. The HD 1004 may be a hard disk drive, for example. The computer is composed of: the CPU 1001 which executes programs such as the access policy reception module 110, the access request reception module 120, the comparison module 130, the access permission module 140, the obligation information addition module 150, the default obligation information addition module 160, and the conversion module 170; the RAM 1002 which stores the programs and data; the ROM 1003 which stores a program for starting the computer etc.; the HD 1004 which is an auxiliary storage device (which may be a flash memory or the like); a reception device 1006 that receives data on the basis of an operation performed by the user on a keyboard, a mouse, a touch panel, or the like; an output device 1005 such as a CRT and a liquid crystal display; a communication line interface 1007 for connection with a communication network such as a network interface card; and a bus 1008 that connects such components for data exchange. Plural computers may be connected to each other through a network.

The exemplary embodiment discussed above implemented by a computer program is implemented by causing a system of the hardware configuration described above to read the computer program as software and causing the software and hardware resources to cooperate with each other.

The hardware configuration illustrated in FIG. 10 indicates one configuration example. The exemplary embodiment is not limited to the configuration illustrated in FIG. 10, and may have any configuration that may execute the modules described in relation to the exemplary embodiment. For example, some of the modules may be constituted by dedicated hardware (such as an ASIC, for example), some of the modules may be provided in an external system and connected through a communication line, and further plural systems illustrated in FIG. 10 may be connected to each other through a communication line to cooperate with each other. In addition, and in particular, the system may be incorporated into not only a personal computer but also an information appliance, a copier, a facsimile, a scanner, a printer, a multi-function machine (image processing device that has functions of two or more of a scanner, a printer, a copier, a facsimile, and so forth), and so forth.

The program described above may be provided as stored in a storage medium, or the program may be provided by communication means. In this case, the program described above may be considered as an invention of a "computer-readable storage medium that stores a program", for example.

The term "computer-readable storage medium that stores a program" refers to a computer-readable storage medium that stores a program and that is used to install, execute, and distribute the program.

Examples of the storage medium include digital versatile discs (DVDs) that conform to standards prescribed by the DVD Forum "DVD-R, DVD-RW, DVD-RAM, etc.", DVDs that conform to standards prescribed by the DVD+RW Alliance "DVD+R, DVD+RW, etc.", compact discs (CDs) such as read-only memory (CD-ROM), CD recordable (CD-R), and CD rewritable (CD-RW), Blu-ray (registered trademark) discs, magneto-optical (MO) disks, flexible disks (FDs), magnetic tapes, hard disks, read-only memories (ROMs), electrically erasable reprogrammable read-only memories (EEPROMs (registered trademark)), flash memories, random-access memories (RAMs), and SD (Secure Digital) memory cards.

The program described above or a part thereof may be saved, distributed, etc. as stored in the storage medium. In addition, the program or a part thereof may be transferred through communication using a transfer medium such as a wired network, a wireless communication network, or a combination thereof used as a local area network (LAN), a metropolitan area network (MAN), a wide area network (WAN), the Internet, an intranet, an extranet, or the like, or may be carried over a carrier wave.

Further, the program described above may be a part of another program, or may be stored in a storage medium together with another program. Alternatively, the program may be stored as divided in plural storage media. In addition, the program may be compressed, encrypted, or stored in any form as long as the program may be restored.

The invention claimed is:

1. An information processing apparatus comprising:
    a processor programmed to
        perform a comparison between first access information having a graph structure indicating a predetermined access policy and second access information having a graph structure indicating an access request for access to an object by a user to determine whether the first access information and the second access information contain mismatched items which do not match each other,
        in response to the comparison resulting in a determination that some of items in the first access information and items in the second access information are the mismatched items, perform an inference on the mismatched items using an ontology of the first access information and the second access information and time-limited rules convert the mismatched items into matching items, and
        permit the access request in response to the items in the first access information and the items in the second access information being converted into the matching items.

2. The information processing apparatus according to claim 1, wherein
    that the processor adds a predetermined condition to the access request in response to the comparison resulting in a determination that the items in the first access information and the items in the second access information do not match each other at all.

3. The information processing apparatus according to claim 2, wherein
    the processor performs a process in response to no matching items being found as a result of performing the inference.

4. A non-transitory computer-readable storage medium that stores an information processing program that causes a computer to:
    perform a comparison between first access information having a graph structure indicating a predetermined access policy and second access information having a graph structure indicating an access request for access to an object by a user to determine whether the first access information and the second access information contain mismatched items which do not match each other,
    in response to the comparison resulting in a determination that some of items in the first access information and items in the second access information are the mismatched items, perform an inference on the mismatched items using an ontology of the first access information and the second access information and time-limited rules convert the mismatched items into matching items; and
    permit the access request in response to the items in the first access information and the items in the second access information being converted into the matching items.

5. An information processing method comprising:
    performing a comparison between first access information having a graph structure indicating a predetermined access policy and second access information having a graph structure indicating an access request for access to an object by a user to determine whether the first access information and the second access information contain mismatched items which do not match each other;
    in response to the comparison resulting in a determination that some of items in the first access information and items in the second access information are the mismatched items, performing an inference on the mismatched items using an ontology of the first access information and the second access information and time-limited rules to convert the mismatched items into matching items; and
    permitting the access request in response to the items in the first access information and the items in the second access information being converted into the matching items.

* * * * *